United States Patent
Johnson

[11] Patent Number: 5,276,995
[45] Date of Patent: Jan. 11, 1994

[54] NET TRAP

[76] Inventor: Steven L. Johnson, 429 Duren Ave., Osteen, Fla. 32764

[21] Appl. No.: 14,871
[22] Filed: Feb. 8, 1993
[51] Int. Cl.[5] .................................. A01M 5/00
[52] U.S. Cl. .................................. 43/133; 43/4; 43/11; 43/7
[58] Field of Search ............. 43/133, 134, 135, 11, 43/12, 7, 4; 56/332, 337; 210/470, 471

[56] References Cited

U.S. PATENT DOCUMENTS

| | | | |
|---|---|---|---|
| 1,133,927 | 3/1915 | Buzard | 56/337 |
| 1,214,450 | 1/1917 | Gifford | 56/337 |
| 2,619,755 | 12/1952 | Henson | 43/12 |
| 2,653,403 | 9/1953 | Oslund | 43/11 |
| 2,921,397 | 2/1959 | Luthi | 43/7 |
| 4,050,177 | 9/1977 | Gerriben | 43/12 |
| 4,050,182 | 9/1977 | Basile | 43/105 |
| 4,272,906 | 6/1981 | Liebling | 43/134 |
| 4,446,646 | 5/1984 | Van't Veld | 43/12 |
| 4,516,347 | 5/1985 | Dickie | 43/11 |
| 4,776,129 | 10/1988 | Kelly | 43/133 |
| 4,982,525 | 1/1991 | Miller | 43/105 |

Primary Examiner—Kurt Rowan
Assistant Examiner—Chuck Y. Mah
Attorney, Agent, or Firm—Paul S. Rooy

[57] ABSTRACT

A net trap incorporating a net attached to both a frame and a bar, which is slidably attached to the frame. A handle is attached to the frame. A release means in the handle allows the bar to slide relative to the frame as urged by an elastic means, thereby closing the net and imprisoning its contents.

8 Claims, 4 Drawing Sheets

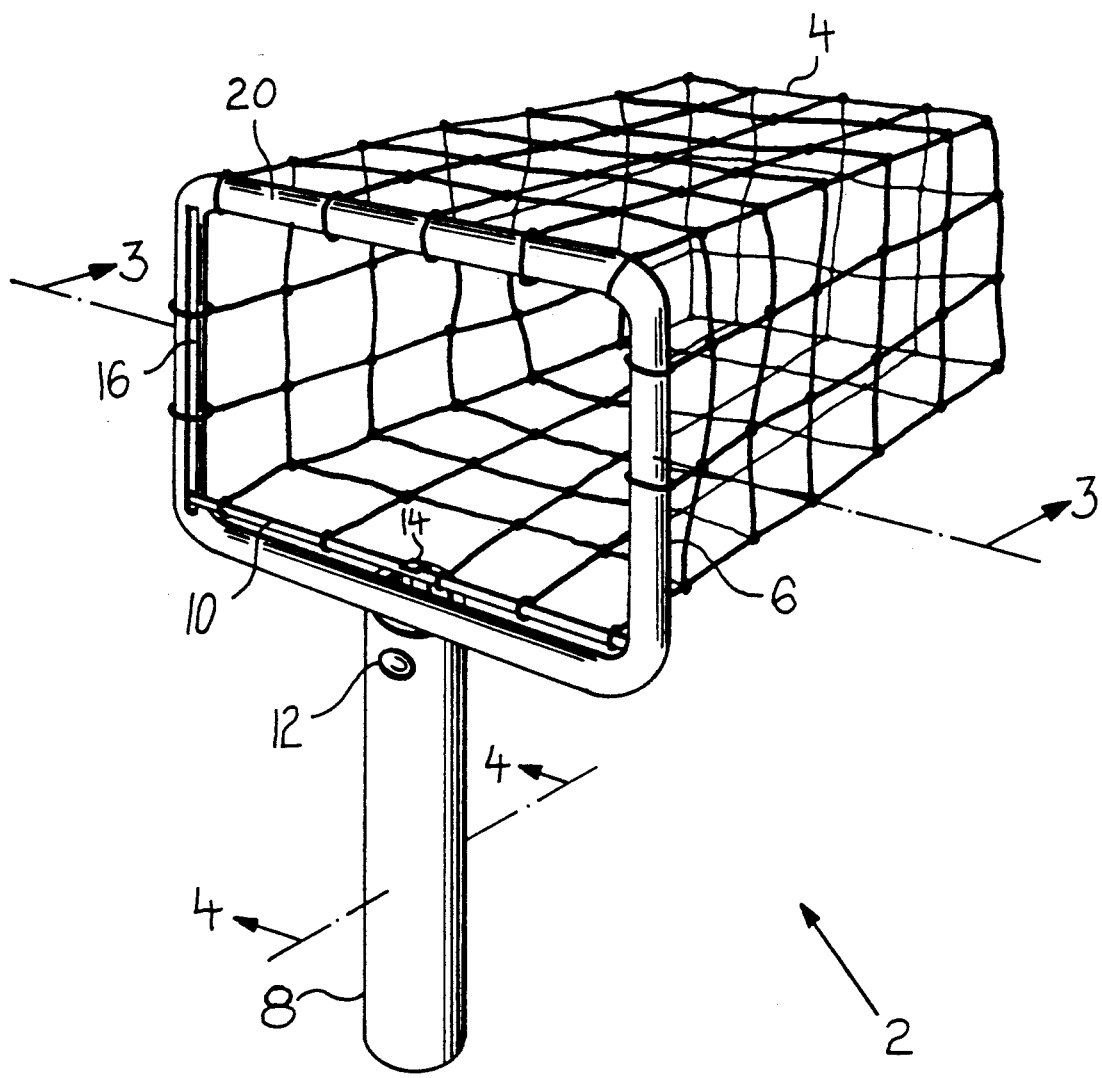

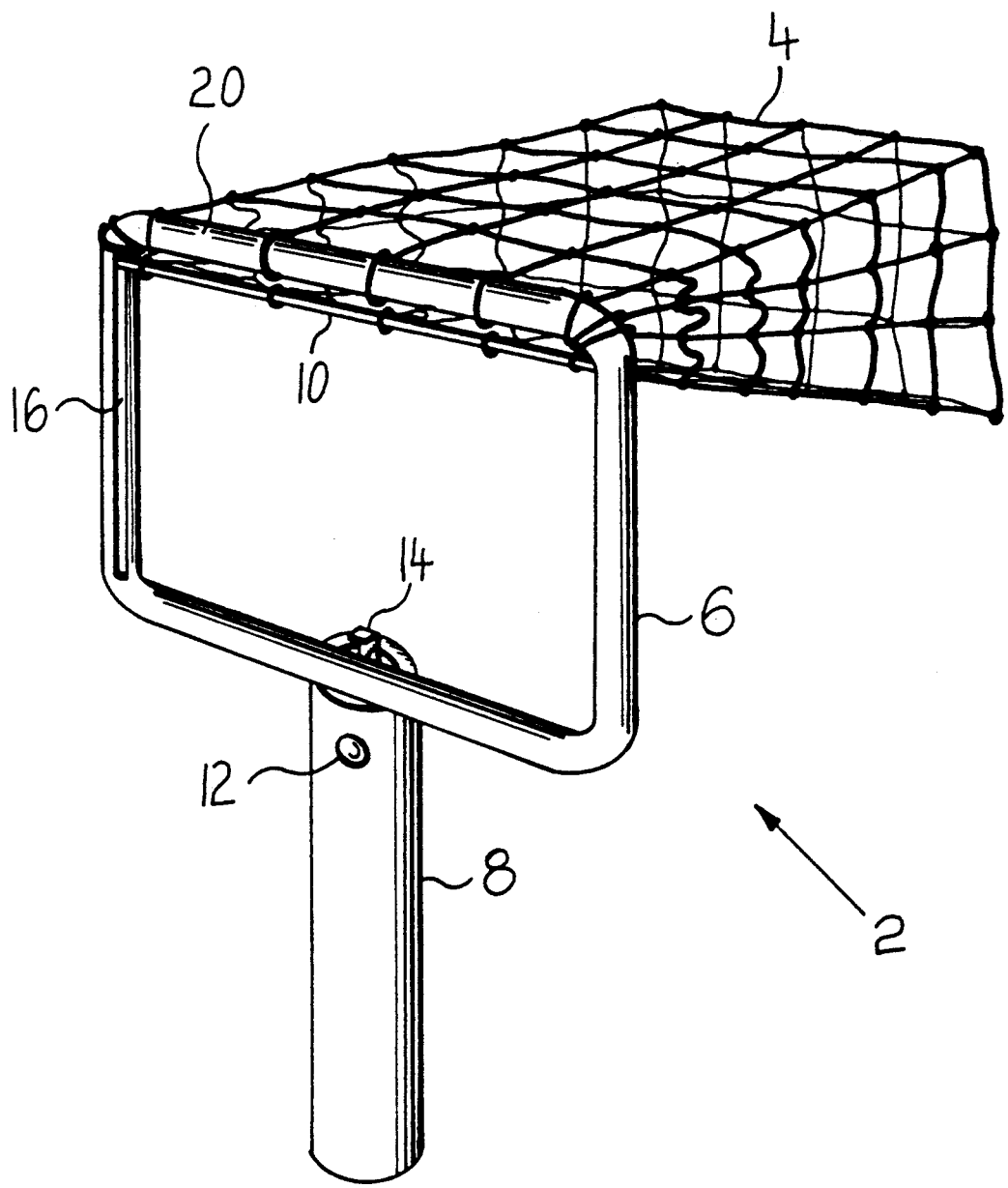

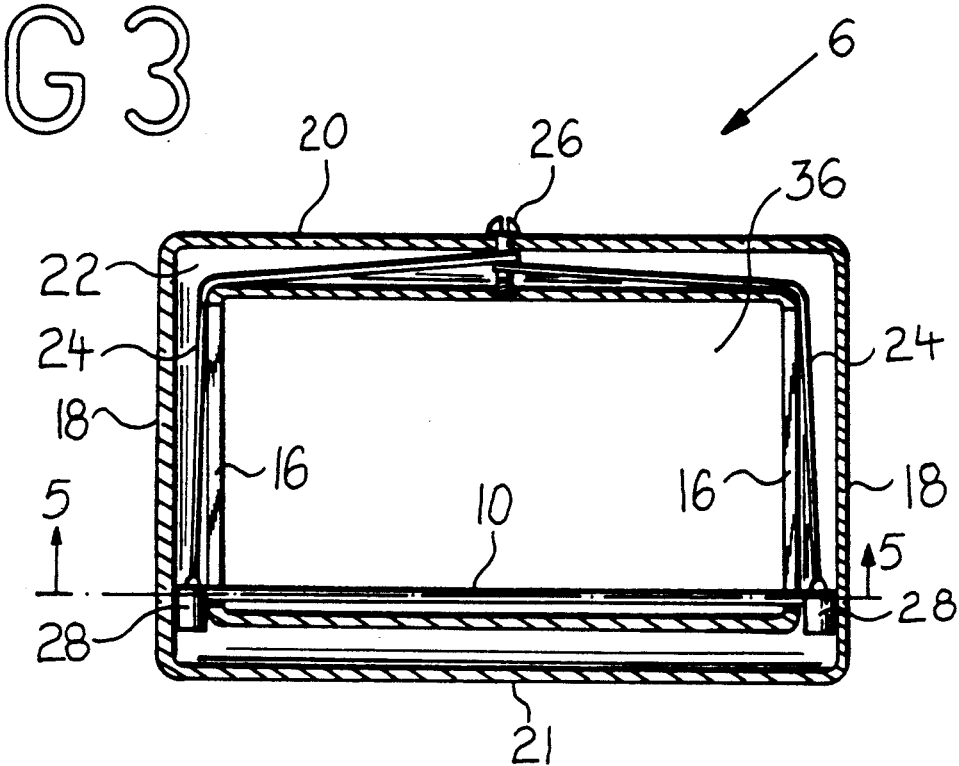
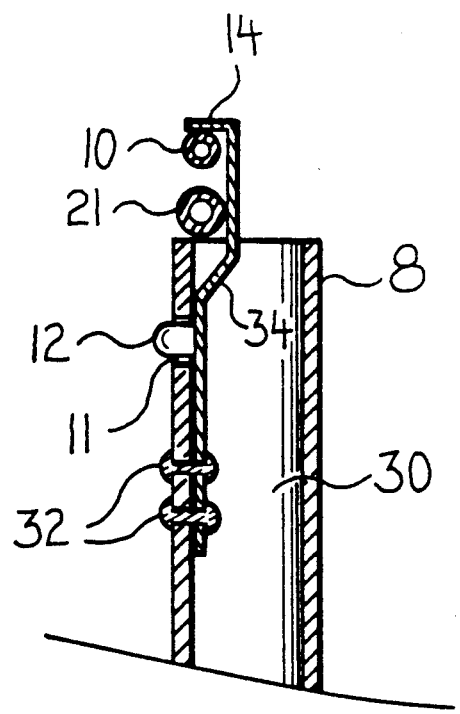

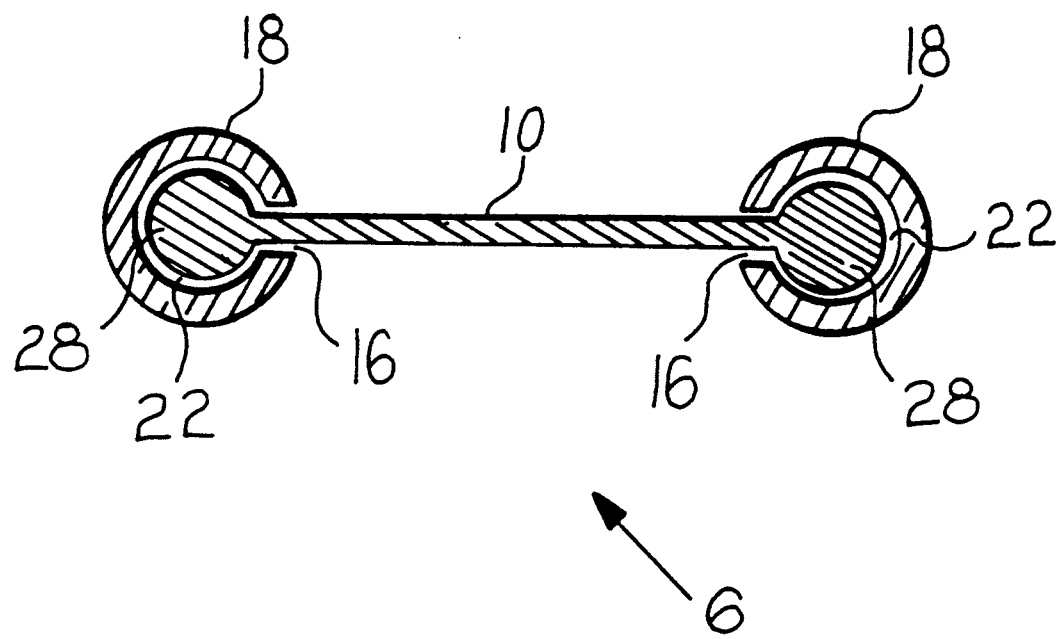

NET TRAP

BACKGROUND OF THE INVENTION

Field of the Invention

The instant invention relates to nets, and in particular to a net incorporating a means to trap its contents in its interior.

Background of the Invention

A wide variety of uses exists for nets. They may be used to capture water creatures such as fish, lobsters and crabs. They may be employed in capturing land animals and in the furtherance of the study of insects. A large variety of nets have been developed to meet these needs.

One major problem associated with the majority of currently available nets is the absence of a means to close the net, thus imprisoning the contents. Lacking this closing means, the contents may escape by emerging from the same aperture they came in through. When this occurs (and it does with predictable regularity) the time spent stalking the animal being captured has been wasted, and the prey, now being alerted into flight mode, may be difficult or impossible to recapture.

A number of approaches have been employed to address this problem. Basile was granted U.S. Pat. No. 4,050,182 for a Book Net. This device is secured to a tether line which, when hauled in, closes the hinged net like a book. Disadvantages associated with this design include unwieldiness and the fact that the net operator must wait for his prey to enter the net: the operator cannot actively pursue his prey.

U.S. Pat No. 4,272,906 was granted Liebling for a Closeable Fish Net. While this device was transportable so as to allow its use to actively pursue fish, it incorporated a sliding cover closure taught to be made of plexiglass or other plastic material. This cover would tend to render the Closeable Fish Net cumbersome due to its weight and water resistance against the impermeable plexiglass cover, especially while scuba diving or snorkling in the pursuit of lobster or crab.

SUMMARY OF THE INVENTION

Accordingly, it is an object of this invention to provide a net trap which is capable of imprisoning its contents after capturing them. Design features allowing this object to be accomplished include a bar slidably attached to a frame, and a net attached to both of these. Advantages associated with the accomplishment of this object include the prevention of escape of whatever has been captured, and prevention of the necessity of performing the task of recapture.

It is another object of this invention to provide a net trap which is easily transported while swimming under water. Design features permitting this object to be achieved include a hollow, lightweight handle and frame. Advantages associated with the accomplishment of this object include the ability to swim faster and farther, and for a longer period of time when using the net trap, and consequently the ability to capture faster prey.

It is still another object of this invention to provide a net trap which is is resistant to corrosion in the presence of humidity. Design features permitting this object to be accomplished include the incorporation of corrosion resistant materials such as plastic and rubber. Advantages associated with the accomplishment of this object include a longer lasting product and enhanced performance reliability.

It is another object of this invention to provide a net trap which is constructed of readily available and economic materials, thereby rendering the net trap easily affordable.

BRIEF DESCRIPTION OF THE DRAWINGS

The invention, together with the other objects, features, aspects and advantages thereof will be more clearly understood from the following in conjunction with the accompanying drawings.

Four sheets of drawings are provided. Sheet one contains FIG. 1. Sheet two contains FIG. 2. Sheet three contains FIGS. 3 and 4. Sheet four contains FIG. 5.

FIG. 1 is a front isometric view of the net trap in the open position.

FIG. 2 is a front isometric view of the net trap in the closed position.

FIG. 3 is a cross-sectional view of the frame taken at section 3—3 of FIG. 1.

FIG. 4 is a cross-sectional view of the upper part of the handle taken at section 4—4 of FIG. 1.

FIG. 5 is a cross-sectional view of the frame taken at section 5—5 of FIG. 3.

DETAILED DESCRIPTION OF THE PREFERRED EMBODIMENT

FIG. 1 is a front isometric view of net trap 2 in the open position. Net 4 is attached to frame 6 and bar 10. Bar 10 is slidably attached at each end to frame 6, and is free to slide up and down within slots 16. Handle 8 is rigidly attached to frame 6.

The action of pressing button 12 disengages catch 14 from bar 10, which allows bar 10 to slide upwards within slots 16. At the end of its travel, bar 10 is disposed in close proximity to upper horizontal member 20, thereby closing net trap 2 and imprisoning its contents.

FIG. 2 is a front isometric view of net trap 2 in the closed position.

FIG. 3 is a cross-sectional view of frame 6 taken at section 3—3 of FIG. 1. Frame 6 is roughly rectangular in shape, and comprises lower horizontal member 21, vertical members 18 and upper horizontal member 20. Frame 6 is hollow, comprising frame bore 22. Each vertical member 18 comprises a slot 16, through which frame bore 22 communicates with the exterior of frame 6.

Frame 6 further comprises bar 10. Bar 10 comprises a bar arm 28 rigidly attached at each end. The cross-sectional shape of bar arms 28 mates with the cross-sectional shape of frame bore 22 (see FIG. 5), thereby constraining bar 10 into a predetermined orientation with respect to vertical members 18 when bar 10 is sliding within slots 16. In the preferred embodiment, bar arms 28 constrain bar 10 into a roughly perpendicular disposition relative to vertical members 18. This ensures that bar 10 will slide smoothly within slots 16.

Referring now to FIG. 5, the preferred embodiment cross-sectional shape of frame bore 22 is round. Therefore, the mating cross-sectional shape of bar arms 28 is round. The cross-sectional shapes of frame bore 22 and bar arms 28 may vary in other embodiments: they may be square, rectangular, hexagonal, oval, etc.

FIG. 5 is a cross-sectional view of frame 6 taken at section 5—5 of FIG. 3. Bar 10 is free to slide within slots 16, and is constrained within slot 16 at each end by means of bar arms 28. Each bar arm 28 has a greater depth dimension than the width of each slot 16, thereby constraining each end of bar 10 within a slot 16. In the preferred embodiment, bar arms 28 have a greater diameter than slots 16, thereby preventing bar 10 from sliding out of slots 16.

Frame 6 further comprises elastic members 24 and screw 26. Each elastic member 24 is attached at one end to screw 26 and at the other end to bar 10. Elastic members 24 urge bar 10 towards upper horizontal member 20.

Net trap 2 is held in the open position (as depicted in FIG. 1) by virtue of catch 14 being engaged with bar 10. When button 12 is depressed, catch 14 disengages with bar 10, thereby allowing bar 10 to slide upwards into close proximity to upper horizontal member 20, thereby closing opening 36 defined by upper horizontal member 20, bar 10 and vertical members 18. Net trap 2 is then in the closed position as depicted in FIG. 2, imprisoning its contents within net 4.

FIG. 4 is a cross-sectional view of the upper part of handle 8 taken at section 4—4 of FIG. 1. Resilient member 34 comprises catch 14 at one and button 12. The end of resilient member 34 opposite catch 14 is attached to handle bore 30 by means of fasteners 32. Button 12 is rigidly attached to resilient member 34 between catch 14 and fasteners 32, and protrudes through button hole 11.

Lower horizontal member 21 is rigidly attached to handle 8.

Frame 6, handle 8 and bar 10 may be fabricated of plastic tube or other appropriate material. Screw 26, resilient member 34 and fasteners 32 may be fabricated of plastic, synthetic material, corrosion resistant metal such as stainless steel, or other appropriate material. Elastic member 24 may be fabricated of natural or synthetic rubber, corrosion resistant metal coil spring, or other appropriate elastic material. Net 4 may be fabricated of cord, synthetic material such as nylon, or other appropriate material.

While a preferred embodiment of the invention has been illustrated herein, it is to be understood that changes and variations may be made by those skilled in the art without departing from the spirit and scope of the appending claims.

DRAWING ITEMS INDEX 2  net trap
4  net
6  frame
8  handle
10  bar
11  button hole
12  button
14  catch
16  slot
18  vertical
20  upper horizontal member
21  lower horizontal member
22  frame bore
24  elastic member
26  screw
28  bar arm
30  handle bore
32  fasteners
34  resilient member
36  opening

I claim:

1. A net trap comprising:
a frame comprising an upper horizontal member, vertical members, each said vertical member being attached at one end to one end of said upper horizontal member, and a lower horizontal member, each end of said lower horizontal member being attached to the end of one of said vertical members opposite the end attached to said upper horizontal member;
a bar slidably attached to said frame;
a net attached to said frame and said bar; and
elastic means which urges said bar into close proximity with said upper horizontal member, said elastic means comprising elastic members, each said elastic member being attached at one end to said bar and at the other end to said upper horizontal member.

2. The net trap of claim 1 further comprising:
a handle having a handle bore rigidly attached to said frame; and
releasable means to hold said bar in close proximity to said lower horizontal member against the urging of said elastic means, thereby holding said net trap in an open position, said releasable means comprising a resilient member, one end of which is attached to said handle bore and the other end of which terminates in a catch, said releasable means being disposed substantially within said handle bore.

3. The net trap of claim 2 wherein each said vertical members comprises a slot, and each end of said bar is free to slide within one said slots.

4. The net trap of claim 3 wherein said releasable means comprises said catch at one end, said catch being releasably engaged with said bar.

5. The net trap of claim 4 wherein said frame comprises a frame bore, the ends of said bar gaining admission into said frame bore through said slots, said elastic means being contained within said frame bore.

6. The net trap of claim 5 wherein said bar comprises a bar arm at each end, the cross-sectional shape of said bar arms mating with and being slightly smaller than the cross-sectional shape of said frame bore, thereby allowing said bar arms to slide freely within said frame bore, said bar arms constraining said bar into a predetermined orientation with respect to vertical members 18, thereby ensuring that said bar will slide smoothly within said slots, without binding.

7. The net trap of claim 6 wherein the cross sectional shape of each said bar arm is a circle whose diameter exceeds the width of each said slot, thereby constraining each end of said bar within said frame bore.

8. The net trap of claim 7 wherein said handle comprises said handle bore and a buttonhole, the end of said resilient member opposite said catch is attached to said handle bore, and said resilient member further comprises a button attached to said resilient member, said button protruding through said buttonhole, whereby said catch is disengagable from said bar, thereby allowing said bar to slide into close proximity with said upper horizontal member, closing said net trap and imprisoning its contents within said net.

* * * * *